2,785,048

PROCESS FOR THE PRODUCTION OF MAGNESIUM HYDROXIDE FROM A LIQUOR CONTAINING MAGNESIUM SULFATE AND AMMONIUM SULFATE

Hellmuth K. Keitel, Kassel, Hesse, Germany

No Drawing. Application September 30, 1953,
Serial No. 383,389

8 Claims. (Cl. 23—119)

The present invention concerns a process for the preparation of readily filterable magnesia and of ammonia salt as well as ammonium magnesia salt.

This application is a continuation-in-part of my application Serial No. 236,688, filed July 13, 1951, now Patent No. 2,659,661, which describes a process wherein in addition to readily filterable magnesia, an ammonium magnesia salt is obtained. It was ascertained that by observing certain conditions it is possible to obtain, apart from magnesia, pure ammonium salt per se or as a preferred product, in addition to ammonium magnesia double salt. This process is carried out similarly to that of the copending application as a cyclic process. In other words, the double salt of magnesium and ammonium obtained first after the precipitation and separation of magnesium hydroxide from the precipitation liquor, freed from $NH_3$, is returned to the initial liquor, so that certain components of this liquor are always recycled.

It has previously been suggested to decompose again the ammonium magnesia sulphate crystallized after evaporation of the liquor with ammonia in order to separate ammonium sulphate and magnesium sulphate. In this case, however, there is no cyclic process involved, and consequently the double salt is not part of a mother liquor rich in $MgSO_4$. On the contrary, in this known process, the purpose is exclusively to make ammonia act under entirely different conditions of precipitation on this equivalent proportions of $MgSO_4$ and $(NH_4)_2SO_4$.

According to the present invention it is possible to return the precipitated and separated ammonium magnesium double salt to the starting liquor for $Mg(OH)_2$ precipitation. It is expressly pointed out that according to the present invention the amounts of magnesium salt and ammonium salt reacted with $NH_3$ are not the theoretically equivalent amounts as in the double salt, but rather that the $NH_3$ is reacted with a solution rich in magnesium salt, containing certain amounts ammonium salts from the recycled double salt.

Hence the invention resides in the fact that for the manufacture of magnesium hydroxide and an ammonium salt or preferably magnesium hydroxide and an ammonium salt besides ammonium magnesia double salt, a liquid containing magnesium salt and ammonium salt, i. e. about 200–420 grams per liter of magnesium salt and 20–120 grams per liter ammonium salt, together with ammonia, is fed into another part of this liquid. In this procedure the ammonium magnesia double salt comes from the ammonium magnesia double salt returned in a previous process. The feeding time amounts to 1–6 hours. Then an after-reaction is allowed another ½–2 hours while stirring. Care is taken to see to it that during the mentioned simultaneous feeding the excess of free ammonia amounts to 40–120 grams per liter being constant during this period. Finally the obtained magnesium hydroxide is filtered off, the excess ammonia expelled, and the resulting liquor cooled with or without partial pre-evaporation in order to precipitate the magnesia ammonium double salt. If an evaporation takes place, the expelled liquor is evaporated until ⅓ of the water therein contained is separated. After precipitation and separation the double salt is fed back entirely or partially and the ammonium salt is produced from the remaining mother liquor by evaporation, with or without addition of a carrier liquor. The amounts of the carrier liquor are twice to twenty times, preferably five times to ten times, of the liquor to be evaporated.

If production of magnesium ammonium double salt is desired rather than ammonium salt in addition to magnesium hydroxide, only a portion of the finally obtained magnesium ammonia double salt is fed back.

As by this means the portion of ammonium salt contained in the double salt is returned to the initial liquor, it is appropriate to carry the $Mg(OH)_2$ precipitation as far as possible in order that from the beginning a portion as small as possible of the double salt is prepared, besides as much free ammonium salt as possible.

These economically maximal conditions have been recognized, solved and applied by the applicant for the first time.

The initial liquor used for the precipitation of the MgO contains 200 to 420 grams per liter, preferably 250 to 350 grams per liter, $MgSO_4$. This liquor is obtained by dissolving kieserite in water and adding ammonium magnesia sulphate produced from the precipitation liquor after precipitating the $Mg(OH)_2$. The ammonium magnesia sulphate is added in such quantities as to provide the initial liquor with an ammonium sulphate concentration of 20 to 120 grams or, preferably 40 to 100 grams, per liter.

The supply of water to the cyclic process must always equal the amount used up in the crystal formation and adhering moisture in the $Mg(OH)_2$ precipitation and in the moisture adhering to the resulting salt or formed into crystal water. It should be observed that, besides, a certain quantity of water is carried in the cyclic process with the $NH_3$ expulsion from the precipitation liquor along with the $NH_3$.

It is possible to shift the relation $(NH_4)_2SO_4:MgSO_4$ to a large extent toward the formation of $(NH_4)_2SO_4$, if the concentration of the mother liquor with respect to $MgSO_4$ is kept in very definite concentration limits. With a precipitation temperature of approx. 60° C. and a practically constant content of free $NH_3$ of about 80 grams per liter, the following approx. values result:

| Initial liquor, grams per liter, $MgSO_4$ | precipitation liquor, grams per liter | | Ratio $(NH_4)_2SO_4:MgSO_4$ |
|---|---|---|---|
| | $(NH_4)_2SO_4$ | $MgSO_4$ | |
| 405 | 292 | 94 | 3.1:1 |
| 352 | 250 | 70 | 3.57:1 |
| 296 | 214 | 57 | 3.75:1 |
| 204 | 163 | 37 | 4.41:1 |

These values show that a concentration from 250 to 350 grams per liter can be considered the most efficient range of concentration for the initial liquor. With a higher concentration, simultaneously with $Mg(OH)_2$, the double salt is crystallized out too, and with a lower concentration the consumption of energy for the subsequent salt production is increased.

It is however possible to establish a favorable ratio $(NH_4)_2SO_4:MgSO_4$ by fixing definite values for the concentration of free $NH_3$, the excess of free ammonia lies between 40 and 120 grams per liter, preferably between 70 and 90 grams per liter. For the $Mg(OH)_2$ precipitation two equivalents of $NH_3$ are required, an amount that must be fed in continuously.

In an initial liquor with 330 grams per liter $MgSO_4$, $d=1.30$, at about 60° C., the $Mg(OH)_2$ precipitation was effected with a variable free excess of $NH_3$, for instance 70, 80, 90 grams per liter, whereby the following precipitation liquors resulted:

| Free $NH_3$ | 70 | 80 | 90 | Grams per liter. |
|---|---|---|---|---|
| $(NH_4)_2SO_4$ | 203 | 216 | 224 | Do. |
| $MgSO_4$ | 82 | 72 | 62 | Do. |

Consequently a ratio $(NH_4)_2SO_4:MgSO_4$ comes to signify: 2.5:3.0, 3.6:1.

In an initial liquor with 248 grams per liter $MgSO_4$, at about 60° precipitation temperature, with 50 grams per liter free $NH_3$ a ratio of roughly 3:1 is attained, whereas with 80 grams per liter $NH_3$ it is roughly 4:1. It has now been ascertained that any further increase, for example, 120 grams per liter free $NH_3$, brings about no further change in this salt relation. This result is surprising and may be explained by the fact that with such concentrations no further dissociation of the gaseous and dissolved $NH_3$ occurs, so that no $HN_4$-ions affecting the equilibrium can be additionally formed.

Thus the maximal ratio of the useful concentration of free $NH_3$ was found to be 80 to 100 grams per liter.

It has been shown furthermore that it is not necessary to increase the concentration of free $NH_3$ during precipitation but rather that this concentration may be held practically constant from the very beginning of the combined feeding of the liquor and ammonia into receiving liquor whereby the advantage of a more exact and simple operation is afforded.

For instance, given a liquor of 35 cubic meters, with the concentration of 240 grams per liter $MgSO_4$, 18 grams per liter $(NH_4)_2SO_4$, with ammonia, in a receiver, containing two cubic meters of liquor, of like concentration, in a precipitation time of about 3 hours, the concentration of free $NH_3$ at between 58 and 64 grams per liter can be kept constant at a precipitation temperature of about 60° C. This procedure supplies an immediately clearly filterable precipitation product with a surprisingly low water content of only 30% of adhering water. If, on the other hand, this precipitation is carried out under the same conditions with, for instance, only 3 to 4 cubic meters of initial liquor instead of 35 cubic meters, a precipitation product with 45% adhering water will result. The amounts of mother liquor, preferably used are 30–60 cubic meters, theoretically those amounts may be increased without limitation, in practice the limits are put to about 150 cubic meters.

This lowering of the adhering water content whenever a larger quantity of precipitation liquor is used, results, of course, in considerable savings in the drying process. The precipitation of the $Mg(OH)_2$, at a temperature of 30 to 90° C., preferably 50 to 80° C., is effected within a period of 1 to 6 hours, preferably 2 to 4 hours. It was found, that an after-reaction occurs on termination of the precipitation of the $Mg(OH)_2$ accomplished in about 3 hours, where for instance, a liquor of 198 grams per liter $(NH_4)_2SO_4$ and 72 grams per liter $MgSO_4$ with 70 grams per liter $NH_3$ is used. For this after-reaction a period of ½ to 2 hours, preferably 1 hour, is required, during which only slow stirring is necessary. Thereby, the concentration of $(NH_4)_2SO_4$ increases to 208 grams per liter and that of $MgSO_4$ simultaneously decreases to 64 grams per liter. Then this conversion subsides and further stirring brings no increase in the $(NH_4)_2SO_4$ concentration, or at most a reversion in consequence of a decrease of the $NH_3$ concentration.

All these measures permit for the first time accomplishing this precipitation reaction under precise known conditions and with varying initial concentrations of $MgSO_4$ and increasing or constant concentrations of free $NH_3$, by utilization of the effect of subsequent stirring, in order to achieve a quite definite ratio of $(NH_4)_2SO_4:MgSO_4$ in the precipitation liquor, and at the same time to obtain a low water containing magnesia.

Example 1

This example illustrates a complete cycle, recovering the double salt by cooling after a partial pre-evaporation of the liquor and thereafter recycling the double salt into the initial liquor, thereby recovering as product besides $Mg(OH)_2$ only $(NH_4)_2SO_4$.

1200 cubic meters, starting liquor of 265 grams per liter $MgSO_4$ liquor and 95 grams per liter $(NH_4)_2SO_4$ are prepared from 750 cubic meters $MgSO_4$ liquor with 280 grams per liter $MgSO_4$ and 450 cubic meters of double salt liquor with 500 grams per liter ammonium magnesia double salt. Of this liquor about 70 cubic meters are used as receiving material into which the remaining liquor and 180 tons $NH_3$ are simultaneously fed at 60° over a period of 3 hours, then the reaction is allowed to proceed while stirring for 1 hour. Thus 103 tons $Mg(OH)_2$ and 1490 cubic meters of precipitation liquor with 80 grams per liter of free $NH_3$ are produced. The precipitation liquor is decanted from the $Mg(OH)_2$, the remainder of the liquor is then separated from the $Mg(OH)_2$ by centrifuging. The excess of $NH_3$ is then expelled from the liquor by heating, in which operation 119 tons $NH_3$ and 1235 cubic meters of expelled liquor with 280 grams per liter of $(NH_4)_2SO_4$ and 85 grams per liter $MgSO_4$ is obtained. The $NH_3$ is returned to the cycle. From the liquor 314 tons of ammonium magnesia sulphate containing crystal water are obtained, by means of partial preliminary evaporation whereby approximately ⅓ of the total amount of water being removed, followed by cooling with cooling water, that double salt in turn yields 450 cubic meters double salt liquor, which are fed back into the starting liquor. From the remaining mother liquor, 235 tons $(NH_4)_2SO_4$ are obtained as product by subsequent further evaporation by the use of a carrier liquor to avoid inspissated evaporation. For the next precipitation, 215 tons $MgSO_4$, as kieserite and some 60 tons $NH_3$ are again introduced.

The enclosed drawing shows a diagrammatic representation of the circulatory process.

The moist $Mg(OH)_2$ obtained in this example contains about 39.3% $MgO$, 17.7% $H_2O$ combined, 41.8% $H_2O$ adhering, 1.2% $MgSO_4$, the resulting ammonium sulphate contains small amounts, (about 1%) $NH_4Cl$ and $Na_2SO_4$, the impurities come from the raw kieserite used as starting material.

Example 2

This example illustrates the recovering of the double salt by cooling without pre-evaporation, the double salt being only partially recycled to the initial liquor, thereby recovering by further evaporation without using a carrier liquor as products besides $Mg(OH)_2$ both the double salt and the ammonium sulphate.

778 cubic meters starting liquor with 320 grams per liter $MgSO_4$ and 27 grams per liter $(NH_4)_2SO_4$, produced from 695 cubic meters $MgSO_4$ liquor with 330 grams per liter $MgSO_4$ and 83 cubic meters double salt liquor with 260 grams per liter $(NH_4)_2SO_4$ and 240 grams per liter $MgSO_4$ together with 140 tons $NH_3$ at a temperature of 70° C. yield 88 tons of $Mg(OH)_2$. The result is 980 cubic meters precipitation liquor, with about 85 grams per liter free $NH_3$, from which 800 cubic meters of expelled liquor with 280 grams per liter $(NH_4)_2SO_4$ and 85 grams per liter $MgSO_4$ is formed, and in addition, 85 tons $NH_3$ which is fed back into the cycle for precipitation of $Mg(OH)_2$.

From the liquor, by cooling, 90 tons of double salt containing crystal water together with 33 tons $(NH_4)_2SO_4$ and 30 tons $MgSO_4$ are obtained. 60 tons of this double salt are dissolved into 83 cubic meters double salt liquor and returned to the starting liquor. Moreover, by subsequent evaporation, 149 tons of $(NH_4)_2SO_4$ and 117 tons of ammonium magnesia sulphate with 37 tons of crystal water are produced.

For the next precipitation 230 tons $MgSO_4$ as kieserite are again introduced along with about 58 tons of $NH_3$.

The precipitation of the two salts on the theoretical "two-salt-point" cannot be separated sharply by evaporation without intermediate cooling. This may be seen in Example 3.

*Example 3*

From 600 cbm. of a liquor containing 247 g./l. $(NH_4)_2SO_4$, 97 g./l. $MgSO_4$, 848 g./l. $H_2O$, and after the free $NH_3$ has been expelled, 156 cbm. water are separated by pre-evaporation, yielding a liquor with 332 g./l. $(NH_4)_2SO_4$, 128 g./l. $MgSO_4$, 780 g./l. $H_2O$. The latter liquor is mixed with 3300 cbm. of a saturated carrier liquor comprising 550 g./l. $(NH_4)_2SO_4$, 7 g./l. $MgSO_4$, 697 g./l. $H_2O$. After mixing the thus formed liquor contains 520 g./l. $(NH_4)_2SO_4$, 21 g./l. $MgSO_4$, 713 g./l. $H_2O$. 77 t. salt containing 8.85% N are precipitated out of this liquor by evaporation of 247 cbm. $H_2O$ and subsequent cooling to 53° C. The ammonium magnesia double salt contains only 7.8% N, that means $(NH_4)_2SO_4$ has been cristallized together with the double salt.

57 cbm. $H_2O$ are now evaporated from the so obtained mother liquor containing 551 g./l. $(NH_4)_2SO_4$, 19 g./l. $MgSO_4$, 690 g./l. $H_2O$, and subsequent cooling to 40° C. yields 176 t. salt containing 14.7% N.

The pure $(NH_4)_2SO_4$ contains 21.2% N. In this way it is not possible to recover the two salts separately on a technical scale, not even, if the precipitation of the salts is performed in stages.

I have now found that it is possible to separate the salts on a technical scale by inserting an intermediate cooling. These conditions are given in Example 4.

*Example 4*

157 cbm. $H_2O$ have been separated by pre-evaporation from 600 cbm. of a liquor containing 250 g./l. $(NH_4)_2SO_4$, 84 g./l. $MgSO_4$, 856 g./l. $H_2O$ and being free of $NH_3$, thereby yielding a liquor containing 330 g./l. $(NH_4)_2SO_4$, 110 g./l. $MgSO_4$, 794 g./l. $H_2O$. This liquor is cooled to approximately 25° C. with cooling water. Thereby about 134 t. ammonium magnesia double salt are precipitated, which are recycled to the starting liquor entirely or partially. The remaining mother liquor is mixed with 3300 cbm. of a saturated carrier liquor comprising 550 g./l. $(NH_4)_2SO_4$, 8 g./l. $MgSO_4$, 696 g./l. $H_2O$, thereby forming a mixed liquor containing 528 g./l. $(NH_4)_2SO_4$, 6 g./l. $MgSO_4$, 706 g./l. $H_2O$. By evaporation of the mother liquor 107 t. $(NH_4)_2SO_4$ are recovered therefrom. The saturated carrier liquor thereby obtained may be used for the same purpose again.

What I claim is:

1. Process for the production of magnesium hydroxide and ammonium sulphate from a liquor containing magnesium sulphate and ammonium sulphate which comprises simultaneously introducing said liquor containing the magnesium sulphate in amounts from 250 to 420 g./l., and the ammonium sulphate in amounts from 20 to 120 g./l., the ammonium sulphate being formed from a magnesium-ammonium double sulphate recycled from a preceding process, and ammonia into a further portion of said liquor with continuous stirring over a period of 1 to 6 hours, ammonia being used in an amount of approximately twice the theoretical equivalent of the magnesium salts, the excess of ammonia being constant and in the range of 70 to 90 g./l., stirring the reactants for ½ to 2 hours, thereby precipitating magnesium hydroxide, filtering off the precipitated magnesium hydroxide expelling excess ammonia, cooling the remaining liquor to precipitate a magnesium-ammonium double sulphate, separating and recycling said double sulphate, evaporating the mother liquor and recovering ammonium sulphate from said evaporated mother liquor.

2. Process according to claim 1, in which the expelled ammonia is recycled for further precipitation of magnesium hydroxide.

3. Process according to claim 1, in which the liquor after expelling excess ammonia is pre-evaporated partially with subsequent cooling, thereby precipitating the magnesium-ammonium double salt.

4. Process according to claim 1, in which the amounts of liquor used for the reaction are 30–150 C. B. M.

5. Process according to claim 1, in which the expelled liquor free of $NH_3$ for the precipitation of the ammonium magnesia double salt is pre-evaporated until one third of the water therein contained is separated, followed by cooling to approximately the temperature of cooling water.

6. Process according to claim 1, in which the mother liquor remaining after separation of the ammonium magnesia double salt is mixed with a saturated carrier liquor, the latter being in amounts of twice to twenty times of the liquor to be evaporated, this mixed liquor being evaporated for recovering the ammonium salt therein.

7. Process according to claim 1, in which the mother liquor remaining after separation of the ammonium magnesia double salt is mixed with a saturated carrier liquor, the latter being in amounts of five to ten times of the liquor to be evaporated, this mixed liquor being evaporated for recovering the ammonium salt therein.

8. Process according to claim 1 for producing ammonium magnesia double salt in addition to ammonium salt and magnesium hydroxide, in which only a part of the magnesium ammonium double salt is recycled.

References Cited in the file of this patent

UNITED STATES PATENTS

| | | |
|---|---|---|
| 1,986,509 | MacIntire | Jan. 1, 1935 |
| 1,988,524 | Stump | Jan. 22, 1935 |
| 2,258,310 | Abbott | Oct. 7, 1941 |
| 2,659,661 | Keitel | Nov. 17, 1953 |

FOREIGN PATENTS

| | | |
|---|---|---|
| 497,149 | Belgium | Nov. 16, 1950 |